Patented Jan. 15, 1946

2,393,075

UNITED STATES PATENT OFFICE 2,393,075

STEROL DERIVATIVES AND PROCESSES FOR THEIR PRODUCTION

Stockton G. Turnbull, Jr., Wilmington, Del., assignor to E. I. du Pont de Nemours & Company, Wilmington, Del., a corporation of Delaware No Drawing. Application March 4, 1943, Serial No. 478,029

1 Claim. (Cl. 260—397.2)

This invention relates to new sterol derivatives and processes for their production. More particularly it refers to new 7-hydroxy-cholesterol derivatives substituted in the 7-position and processes for their production and use.

Numerous sterol derivatives generally and cholesterol derivatives particularly have been described in the prior art with various methods for their production and use. Among these derivatives are 7-hydroxy-cholesterol per se and 7-hydroxy-cholesterol substituted in the 3-position or substituted in both the 3- and 7-position. However, 7-hydroxy-cholesterol substituted in the 7-position alone has never before been described and so far as is known no method of producing it or using it has been evolved.

It is an object of this invention to produce 7-hydroxy-cholesterol substituted in the 7-position. A further object is to produce 7-hydroxy-cholesterol esterified in the 7-position. A still further object is to produce by new and efficient processes valuable provitamin D intermediates. A still further object is to produce 7-hydroxy-cholesterol-7-mono esters. A still further object is to utilize the foregoing and related compounds in the production of derivatives thereof which are of particular value in the industrial arts and more especially in the vitamin art. Additional objects will become apparent from a consideration of the following description and claims.

These objects and others are attained in accordance with the present invention wherein a 7-hydroxy-cholesterol substituted in both the 3- and 7-positions is treated in order to convert the substituent on the 3-position to a hydroxyl group. In a more restricted sense, these objects are achieved by treating a 7-hydroxy-cholesterol esterified in the 7-position and also substituted in the 3-position in order to convert the 3-substituent to a hydroxyl group without substantial change in the ester group substituted on the 7-position. This invention is also concerned with the production of a 7-hydroxy-cholesterol esterified in the 7-position, by de-etherification of a 3-ether of 7-hydroxy-cholesterol substituted in the 7-position with an ester group. In a still more restricted sense this invention is concerned with a process for producing a 7-hydroxy-cholesterol esterified in the 7-position by heating a 3-trityl ether of 7-hydroxy-cholesterol substituted in the 7-position with an ester group, in the presence of a de-etherifying agent for a sufficient period of time to convert the 3-ether group to a hydroxyl group without substantial change in the remainder of the molecule. In one of its preferred embodiments this invention concerns a process for producing 7-hydroxy-cholesterol-7-monobenzoate whereby the 3-trityl ether of 7-hydroxy-cholesterol-7-benzoate is de-etherified: For example, by heating in the presence of glacial acetic acid, said de-etherification reaction being continued for a sufficient period of time and under such conditions as to convert the 3-ether group to a hydroxyl group without noticeable change in the remainder of the molecule. This invention also pertains to products produced by the foregoing process and the employment of these products in the industrial arts.

The invention may be more readily understood by a consideration of the following illustrative examples wherein the quantities are stated in parts by weight.

EXAMPLE 1

*De-etherification of the 3-trityl ether of 7-hydroxy-cholesterol-7-benzoate*

3.48 parts of the 3-trityl ether of 7-hydroxy-cholesterol-7-benzoate was heated while dissolved in 80 parts of glacial acetic acid at 60° C. for 6.5 hours. The reaction mixture was poured into water and extracted into ethyl ether. After washing free of acetic acid and drying over sodium sulfate, the ethyl ether was concentrated to obtain 2 parts of a mixture of white crystals with yellow oil. By trituration with methyl alcohol 0.4 part of triphenyl carbinol was obtained. The new 7-hydroxy-cholesterol-7-monobenzoate was obtained from the methanolic mother liquor.

EXAMPLE 2

*Conversion of 7-hydroxy-cholesterol-7-monobenzoate to the dibenzoate*

On benzoylation of the 7-hydroxy-cholesterol-7-monobenzoate, prepared exactly according to the method of Example 1, with 3 parts of benzoyl chloride in 10 parts of anhydrous pyridine there was obtained 1.3 parts of 7-hydroxy-cholesterol-dibenzoate, which from melting point and mixed melting point was identical with an authentic sample.

It is to be understood that the foregoing examples are illustrative merely of the present invention and that they may be varied widely with respect to the individual reactants, the proportions thereof and the conditions of reaction without departing from the scope hereof.

In place of the 3-trityl ether of 7-hydroxy-cholesterol-7-benzoate any other 7-hydroxycholesterol derivative which is substituted in both the 3- and 7-position may be used. This di-substituted 7-hydroxy-cholesterol derivative should thereafter be treated in such manner that the substituent on the 3-position is converted to a hydroxyl group without attack upon the substituent present on the 7-position. This treatment naturally will vary to a certain extent with the particular substituents involved, although no difficulty should be occasioned in carrying out the desired invention in view of the instructions heretofore and hereinafter set out. Furthermore, in view of these instructions it is possible to prepare those di-substituted derivatives of 7-hydroxy-cholesterol which are most easily subject to attack on the 3-position, by the desired reaction.

In place of a single 3,7-di-substituted 7-hydroxy-cholesterol derivative it is contemplated that a plurality of such compounds may be employed. So long as the plurality of di-substituted compounds are more susceptible to attack by the desired treatment on the 3-position rather than the 7-position the resulting products will be 7-mono-substituted derivatives of 7-hydroxy-cholesterol.

Among the foregoing di-substituted derivatives of 7-hydroxy-cholesterol which are particularly adapted for use herein, mention may be made of the 3-ethers of 7-hydroxy-cholesterol substituted in the 7-position with an ester group. The treatment of compounds of this type is particularly advantageous because the 3-substituent is of a different chemical nature than the 7-substituent. In this instance the 3-substituent is an ether group, whereas the 7-substituent is an ester group, consequently the treatment of these compounds by means of a de-etherification reaction results in the selective attack on the 3-substituent whereby it is converted to a hydroxyl group. The desired de-etherification reaction could not then attack the ester group substituted on the 7-position. Consequently, the resulting product is a 7-hydroxy-cholesterol-7-mono ester, or mixture thereof.

In the same manner as previously mentioned, other derivatives of 7-hydroxy-cholesterol which are substituted in both the 3- and 7-positions, may be employed. For optimum results over a wide variety of conditions it is preferred to select those derivatives of 7-hydroxy-cholesterol which have an entirely different chemical substituent on the 3-position from the chemical substituent on the 7-position. The next best procedure is to select di-substituted derivatives of 7-hydroxy-cholesterol wherein the substituents on both the 3- and 7-position are of the same chemical class but are different members thereof. It is also possible to have the same substituents on both the 3- and 7-position, but this frequently produces complications since the reaction to which the compound is subjected is likely to attack both substituents, although not to the same extent. As a result, more care is necessary in selecting the particular reaction and in conducting it, and the final desired products are apt to be in lower yield than in the other instances referred to heretofore.

The preferred class of di-substituted derivatives of 7-hydroxy-cholesterol is 3-triaryl-methyl ethers of 7-hydroxy-cholesterol-7-mono esters. The 3-trityl ether of 7-hydroxy-cholesterol-7-benzoate is representative of this class. In place of this latter compound other triaryl-methyl ethers of 7-hydroxy-cholesterol-7-mono esters may be used. Likewise, in place of the 7-mono-benzoate ester other ester groups such as the acetate, propionate, 3,5-dinitrobenzoate, etc., might be used.

As previously mentioned, the particular manner in which the 3-substituent is converted to a hydroxyl group will depend to a great extent upon the particular compound or compounds selected. Where the 3-substituent is an ether group the reaction will of course be a de-etherification reaction. On the other hand, where the 3-substituent is not an ether group, the particular reaction will be selected in accordance with the chemical character of the 3-substituent and also in accordance with the chemical character of the 7-substituent. Where the 3- and 7-substituents are members of different chemical classes there is, as a general rule, a wider range of reactions to select from than if they are members of the same class.

The temperature and time of reaction will also be dependent upon the particular compounds which are undergoing treatment. As a general rule, slightly elevated temperatures are preferred and times which may vary from a few minutes to a few hours or even days. As the temperature of the reaction is increased the time should be decreased accordingly.

The 7-hydroxy-cholesterol-7-mono derivatives described herein are, as far as is known, new. They may be further reacted to convert the 7-substituent to some other derivative of 7-hydroxy-cholesterol. In the same manner they may be further reacted to convert the 3-hydroxy group to a different group. For example, 7-hydroxy-cholesterol-7-mono-benzoate may be treated with benzoyl chloride to produce 7-hydroxy-cholesterol-dibenzoate. This latter compound may be treated in accordance with known methods to convert it to 7-dehydro-cholesterol, which is a valuable provitamin D. In the same manner, 7-hydroxy-cholesterol acetate or propionate or 3,5-dinitrobenzoate, etc., may be converted to di-substituted derivatives of 7-hydroxy-cholesterol or to other mono-substituted derivatives thereof, and the resulting products may be further treated to produce numerous compounds of appreciable value in the pharmaceutical and other fields.

By means of the present invention a new and heretofore unappreciated class of 7-mono-substituted derivatives of 7-hydroxy-cholesterol has been produced in a simple and efficient manner. These compounds are of particular value as vitamin D and other pharmaceutical intermediates. A wide variety of new compounds may be produced in accordance with this invention from a large number of starting materials. Consequently there is an extremely wide range of selection of starting materials and also of reaction conditions.

As many widely different embodiments of this invention may be made without departing from the spirit and scope thereof, it is to be understood that the invention is not limited to the specific embodiments thereof except as defined in the appended claim.

I claim:

A process for producing 7-hydroxy-cholesterol-7-monobenzoate which comprises heating the 3-trityl ether of 7-hydroxy-cholesterol-7-benzoate in the presence of glacial acetic acid for a sufficient period of time to convert the 3-ether group to a hydroxyl group without noticeable change in the remainder of the molecule.

STOCKTON G. TURNBULL, Jr.